United States Patent [19]

Onoda et al.

[11] 3,832,611
[45] Aug. 27, 1974

[54] CYCLOCONVERTER TYPE THYRISTOR MOTOR

[75] Inventors: Yoshimitsu Onoda; Kunio Saito; Yosio Okumura, all of Katsuta; Toshiaki Okuyama, Hitachi; Nobuaki Otazawa, Katsuta, all of Japan

[73] Assignee: Hitachi, Ltd., Tokyo, Japan

[22] Filed: July 31, 1973

[21] Appl. No.: 384,297

[30] Foreign Application Priority Data
Aug. 7, 1972 Japan.............................. 47-78352

[52] U.S. Cl................. 318/171, 318/227, 318/230, 318/231
[51] Int. Cl. ............................................. H02p 5/34
[58] Field of Search .......... 318/138, 171, 227, 230, 318/231

[56] References Cited
UNITED STATES PATENTS
3,624,472  11/1971  Graham ........................... 318/227
3,702,429  11/1972  Sawyer et al. ..................... 318/227
3,790,873  2/1974   Witten .............................. 318/227
3,793,573  2/1974   Tsuboi ............................. 318/227

*Primary Examiner*—Gene Z. Rubinson
*Attorney, Agent, or Firm*—Craig & Antonelli

[57] ABSTRACT

A thyristor motor comprising a synchronous motor, a cycloconverter of thyristor type connected with the synchronous motor to supply electric power for the motor, current detectors provided in the thyristor arms of the cycloconverter, switches provided in the arms, a means for detecting the coincidence between the power frequency and the motor frequency, and another means for determining an instant at which the switches are opened to disconnect the arms, depending upon the output signals of the current detector and the detecting means and for connecting the disconnected arms in parallel with one another, whereby the current concentration upon a particular thyristor and the undulation of the voltage induced by the thyristor motor are prevented.

11 Claims, 9 Drawing Figures

(a) VOLTAGE INDUCED BY MOTOR 4

(b) OUTPUT OF DISTRIBUTOR 5

(c) VOLTAGE OF a.c. SOURCE 1

(d) OUTPUT OF PHASE SHIFTER 6

(e) SIGNAL FOR FIRING THYRISTOR ARM UP1

(f) SIGNAL FOR FIRING THYRISTOR ARM UP2

(g) SIGNAL FOR FIRING THYRISTOR ARM VP1

(h) SIGNAL FOR FIRING THYRISTOR ARM VP2

(i) SIGNAL FOR FIRING THYRISTOR ARM WP1

(j) SIGNAL FOR FIRING THYRISTOR ARM WP2

CYCLOCONVERTER TYPE THYRISTOR MOTOR

The present invention relates to a thyristor motor of cycloconverter type.

A thyristor motor is constituted of an a.c. or d.c. power source, a thyristor converter to convert the power of the source, a synchronous motor driven by the thyristor converter, and an angular position detector to detect the angular position of the shaft of the synchronous motor, and in the thyristor motor are fired the thyristors of the thyristor converter, depending upon the angular positions of the motor shaft detected by the angular position detecter.

The thyristor motor is classified, depending upon the structure of the most essential part, i.e., thyristor converter, into two types: one using an inverter to transform direct current as a power source into alternating current and the other using a cycloconverter to directly transform a given a.c. power into a desired a.c. power.

The notable features of the thyristor motor are, for example, an excellent controllability as enjoyed by a d.c. motor and an adaptability for high speed and heavy power performance. Recently, it has found its meritorious use as an a.c. power apparatus as well as a driving apparatus such as for a high speed rotary machine having a large capacity. This is because the voltage induced in the armature winding of the synchronous motor is a stable a.c. signal having a regular waveform, i.e., sine wave.

However, the thyristor motor has the following drawbacks, too. Namely, the number of thyristors used is considerable. In addition, when the frequency of the a.c. source becomes coincident with that of the thyristor motor, currents concentrate on a particular thyristor so that each thyristor must have a sufficiently large capacity with a result that it is accompanied usually by high cost. Moreover, when the frequency of the power source becomes approximately equal to that of the thyristor motor in case where it is used as an a.c. source, the voltage induced by the thyristor motor undulates due to interference beating so that a rotary machine connected as a load will cause torque ripple while a load lamp has alternating flicker periods.

It is, therefore, the object of the present invention to provide a thyristor motor of cycloconverter type in which the current concentration upon a particular thyristor and the undulation of the voltage induced by the thyristor motor are prevented and which can be inexpensively fabricated without degrading its characteristics.

According to the present invention, the correlation between the current concentration and the interference beating is considered. Namely, when the power frequency becomes approximately equal to that of the voltage generated by the thyristor motor and as soon as current has concentrated upon a particular thyristor arm, the remaining non-conducting thyristor arms are disconnected. By doing this, the beating is suppressed. Moreover, according to the present invention, the disconnected thyristor arms are connected in parallel with the thyristor arm on which currents concentrated so that the capacity of each thyristor need not be increased.

Other objects, features and advantages of the present invention will be apparent when the following part of this specification is read with the aid of the accompanying drawings, in which.

In order to understand the significance of the present invention, it will be useful to describe a conventional thyristor motor.

Figure 1:
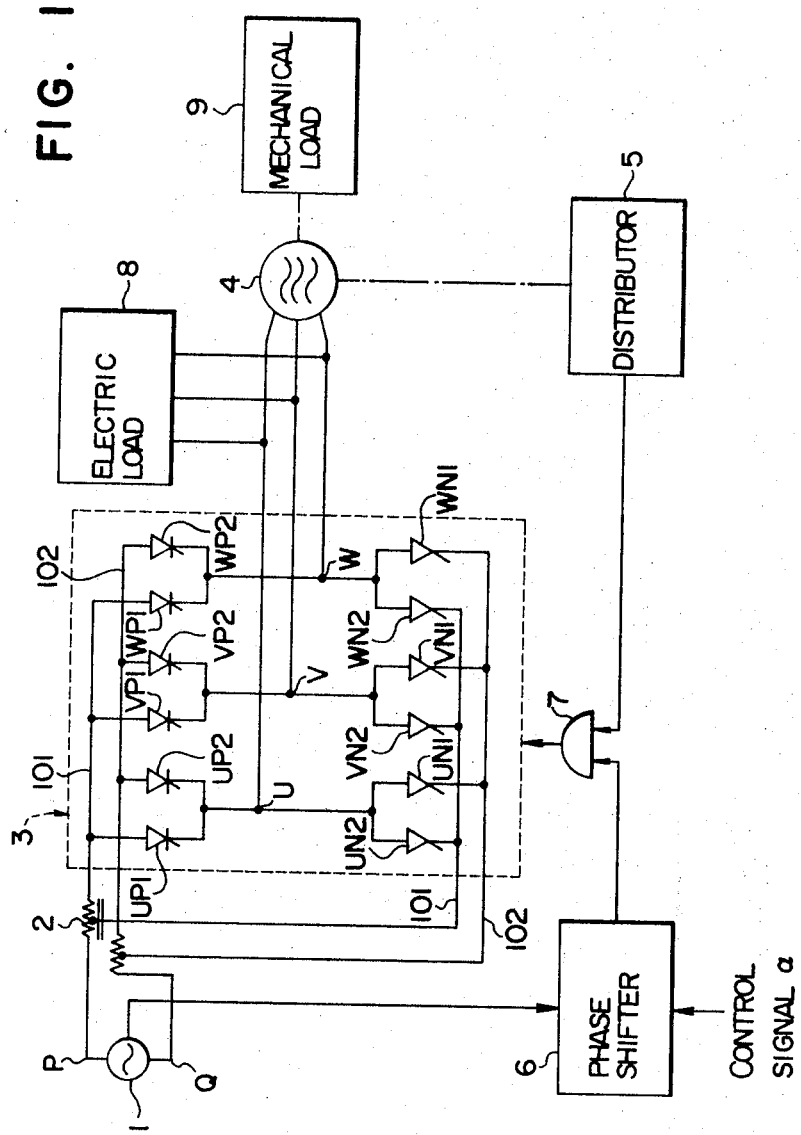
FIG. 1 is an electric circuit of a conventional thyristor motor.

FIG. 1 shows the circuit of a conventional thyristor motor having a single phase a.c. power source. In FIG. 1, reference numeral 1 designates a single-phase a.c. source; 2 a smoothing reactor; 3 a cycloconverter of thyristor type constituted of thyristor arms UP1 to WN2; 4 a synchronous motor; 5 a distributor to generate signals corresponding to the field angular position of the synchronous motor 4; 6 a phase shifter; 7 an AND gate to receive the outputs of the distributor 5 and the phase shifter 6, the AND gate 7 delivers a gating signal to the cycloconverter 3; 8 an electric load; 9 a mechanical load; and 101 and 102 power supplying buses. Characters U, V and W indicate the phases U, V and W of the armature windings of the synchronous motor 4. The thyristor arm UP1 is shown as a positive arm of the phase U connected with the power bus 101 while the thyristor arm WN1 is represented as a negative arm of the phase W connected with the power bus 102.

With this circuit arrangement, alternating current from the single-phase a.c. source 1 is converted to three-phase alternating current of variable frequency by means of the cycloconverter 3 and the three-phase power is fed to the synchronous motor. The synchronous motor 4, in turn, supplies energy to the electric load 8 connected with the motor 4 and the mechanical load coupled to the shaft of the motor 4. Alternatively, single-phase alternating current having a constant frequency (e.g. 50 Hz) is converted to three-phase alternating current having a constant frequency (e.g. 50 Hz) by means of the cycloconverter 3, the converted three-phase power is fed to the synchronous motor 4.

The operation of the thyristor motor 4 in FIG. 1 will now be described respectively in the cases (1) where the frequency of the a.c. source 1 is higher than that of the voltage generated by the motor 4, (2) where those frequencies are equal to each other and (3) where the former is lower than the latter.

Figure 2:
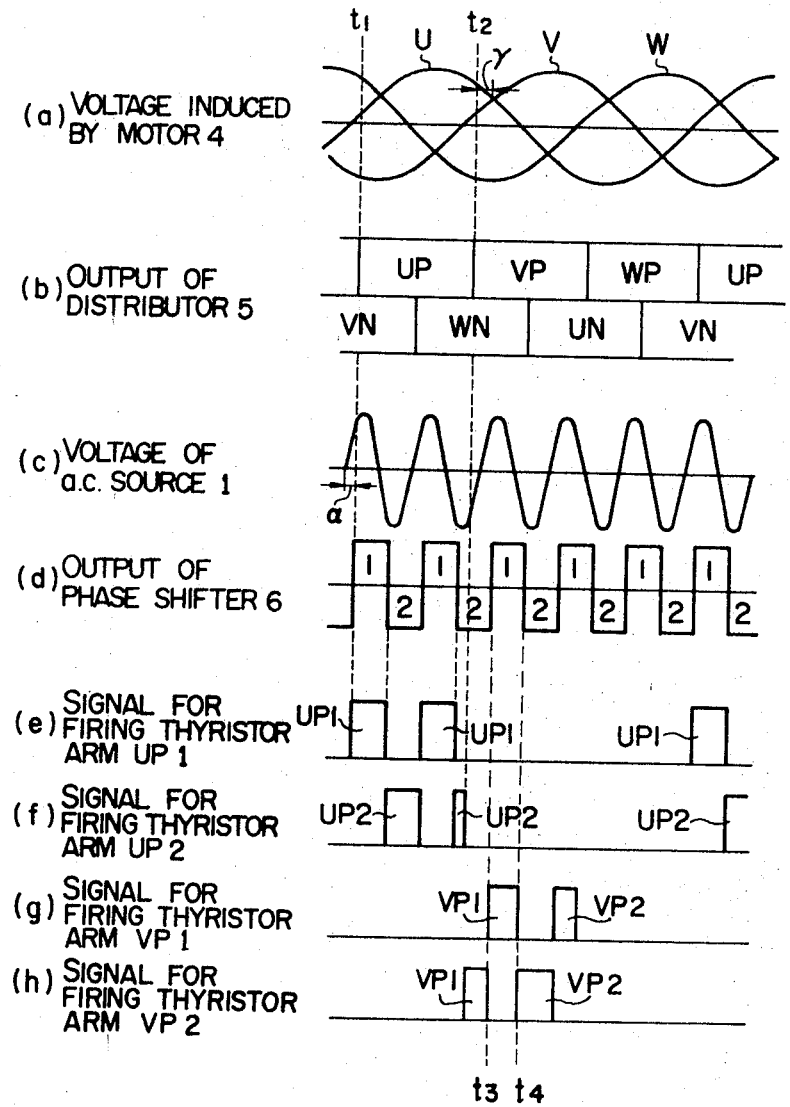
FIGS. 2, 3 and 4 show signal waveforms useful to explain the operation of the thyristor motor shown in FIG. 1.

1. Explanation is given in case where the frequency of the a.c. source 1 is higher than that of the voltage generated by the motor 4, concerning the phase U, with reference to FIG. 2. Diagram (a) of FIG. 2 represents the voltage induced by the motor 4 (phase voltage) when it is rotating at a constant speed. Diagram (b) indicates the output of the distributor 5, diagram (c) the voltage waveform of the a.c. source 1, (d) the output signal of the phase shifter 6, (e) the firing signal for the thyristor arm UP1, and (f) the firing signal for the thyristor arm UP2. In the figure (c), $\alpha$ indicates a control angle of retardation supplied from the phase shifter 6 and in the figure (a), $\gamma$ indicates a control angle of advance supplied from the distributer 5.

The distributor 5 serves to select the firing of that thyristor arm which corresponds to the phase of the cycloconverter 3 relative to the field angular portion of the motor 4. Namely, the thyristor arms are fired by means of the distributor 5 in the phase relationship and order as shown in FIG. 2, diagram (b) with respect to the induced voltage of the motor 4 as shown in the diagram (a) of FIG. 2. For example, during the period $t_1$ to $t_2$, the thyristor arms UP1 and UP2 are selectively fired.

The phase shifter 6 serves to determine the firing angles of the thyristor arms with respect to the voltage of the a.c. source 1 as shown in the diagram (c) of FIG. 2, according to a control signal and delivers the signal as shown in the diagram (e) of FIG. 2. The output signal (b) of the distributor 5 and the output signal (d) of the phase shifter 6 are fed through the AND gate 7 to finally form the signals for firing the thyristors of the cycloconverter 3. For example, during a period $t_1$ to $t_2$, the thyristor arms UP1 and UP2 receive the firing signals (e) and (f), respectively. Accordingly, the thyristor arms UP1 and UP2 alternately share the load current of the phase U of the motor 4 according to the firing signals.

Now, the change-over of the load current from the phase U to the phase V of the motor 4, i.e., phase-to-phase commutation, will be described.

At the instant $t_2$ in FIG. 2, the firing signal to the thyristor arm UP1 is interrupted and a firing signal is applied to the thyristor arm VP2. At this moment, since the induced voltage of the phase U of the motor 4 is higher than that of the phase V of the motor 4, current (commutation current) flows through a path: phase U terminal — thyristor arm UP2 — thyristor arm VP2 — phase V terminal. Consequently, the load current flowing through the thyristor arm UP2 is cancelled and in turn the thyristor arm VP2 draws current. If the value of this commutation current, that is, current flowing when the terminals of the phases U and V are short circuited, is larger than that of the current flowing through the thyristor arm UP2, then the commutation by the voltage induced by the motor 4 is successful.

In general, the higher is the rotational speed of the motor 4, the higher is the induced voltage and the heavier is the commutation current flowing, so that no problems will occur in the phase-to-phase commutation. However, if the voltage induced by the motor is zero or very low as when the motor is started from its stationary state, the phase-to-phase commutation by the induced voltage can not be expected. The thyristor motor as shown in FIG. 1, having an a.c. source 1, can successfully perform such phase-to-phase commutation with the aid of the a.c. source 1. For example, even if, as shown in the figure (g), commutation from the thyristor arm UP2 to the thyristor arm VP2 fails at time $t_2$, the thyristor arm VP1 is fired during the next half cycle at time $t_3$ as shown in the figure (h) so that a heavy current to cancel the current through the thyristor arm UP2 flows through a path: terminal P of the a.c. source — thyritor arm VP1 — phase V terminal — pase U terminal — thyristor arm UP2 — terminal Q of the a.c. source, thereby the thyristor arm UP2 being extinguished. In this case, the phase-to-phase commutation of the armature current of the motor 4 is successfully performed from the start and the thyristor arms UP1 and UP2 draw current equally.

The foregoing description is made concerning mainly the phase U, and the same is true for the other phases V and W, with respect to which each thyristor arm carries equal current.

Figure 3:
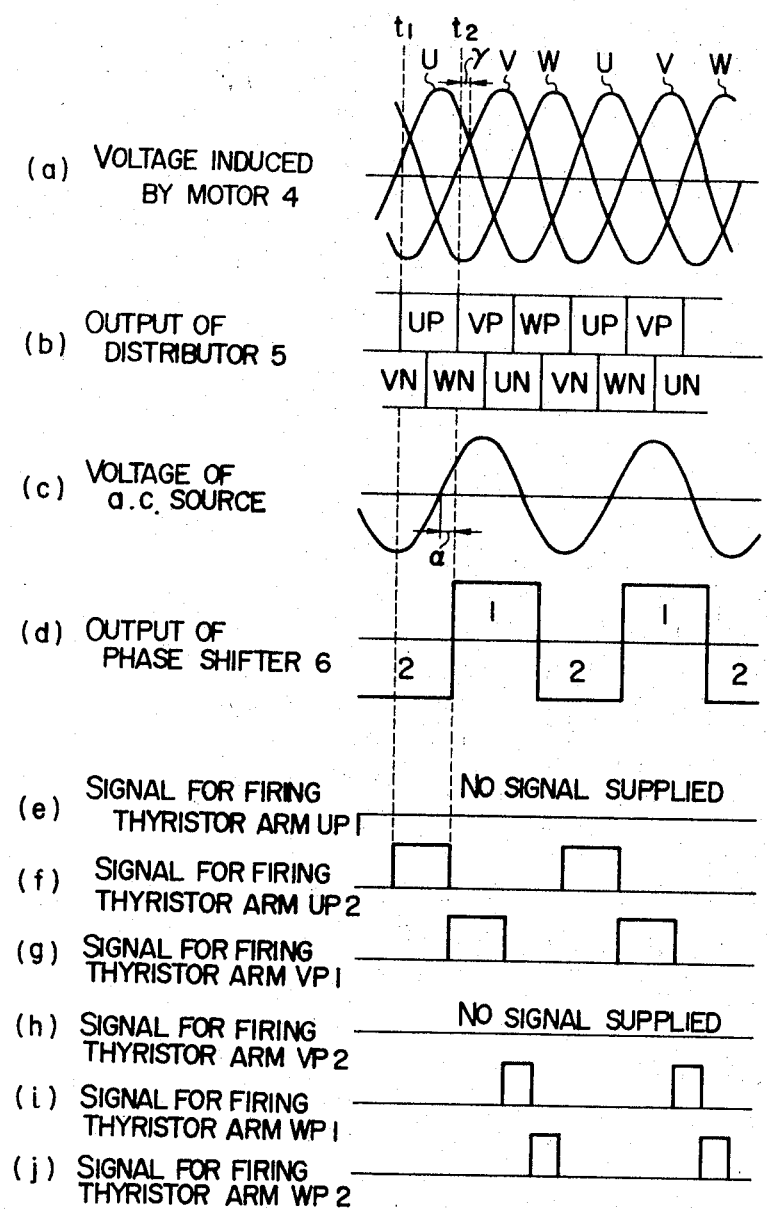

2. Explanation is given of the case where the frequency of the power source is equal to that of the voltage induced by the motor 4, with the aid of FIG. 3. In this case the equal distribution of current to the respective thyristor arms is no longer maintained and current concentration on a particular thyristor arm will occur. In FIG. 3, diagram (a) designates the voltage induced by the motor 4; diagram (b) the output signal of the distributor 5; (c) the voltage waveform of the a.c. source 1; (d) the output signal of the phase shifter 6; (e) the firing signal for the thyristor arm UP1; (f) the firing signal for the thyristor arm UP2; (g) the firing signal for the thyristor arm VP1; (h) the firing signal for the thyristor arm VP2; (i) the firing signal for the thyristor arm WP1; and (j) the firing signal for the thyristor arm WP2.

The gating signals, which are formed by the logical product of the outputs (b) and (d) of the distributor 5 and the phase shifter 6, respectively for the thyristor arms UP1, UP2, VP1, VP2, WP1 and WP2 are as shown in the diagrams (e), (f), (g), (h), (i) and (j) in FIG. 3, respectively. In this case, the currents of the phases U and V of the motor 4 flow respectively through the thyristor arms UP2 and VP1 alone, the thyristor arms UP1 and VP2 sharing no load current. Thus, where the frequency of the power source 1 is equal to that of the voltage induced by the motor 4, the load current will concentrate through particular thyristor arms.

Figure 4:
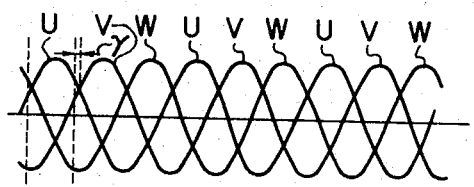
Figure 4:
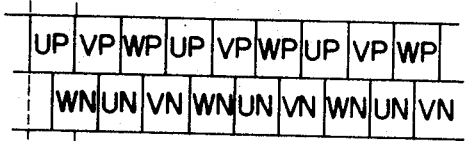
Figure 4:
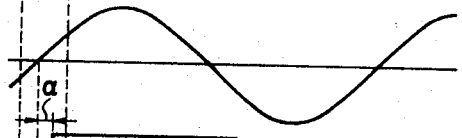
Figure 4:
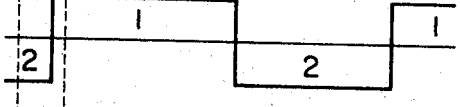
Figure 4:
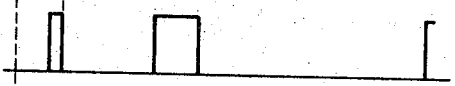
Figure 4:
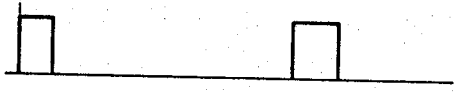
Figure 4:
Figure 4:
Figure 4:
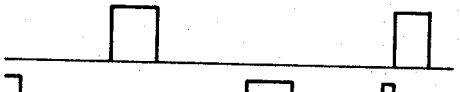
Figure 4:

3. Explanation is given to the case where the power frequency is lower than that of the voltage induced by the motor 4. In this case, no current concentration occurs on the respective thyristor arms as seen from the diagrams (e) to (j) in FIG. 4 since the phase-to-phase commutation is performed during one cycle of the source.

The summary of the foregoing description is as follows. In case where the frequency of the power source is equal to that of the voltage induced by the motor 4, current will concentrate through a particular thyristor arm. This phenomenon occurs especially in the operation of the thyristor motor in which power having a constant frequency, supplied by a single phase source is converted to a three-phase power having the same frequency to energize the motor 4. An example is a vehicle-carried thyristor motor to receive single-phase power from stringed lines. Therefore, in the thyristor motor in which the frequency of the voltage induced by the synchronous motor is varied during operation with respect of the frequency of the power source, the capacity of each thyristor arm must be greater than one required in the normal condition. However, the use of the thyristors having higher capacity is accompanied by higher cost.

Figure 5:
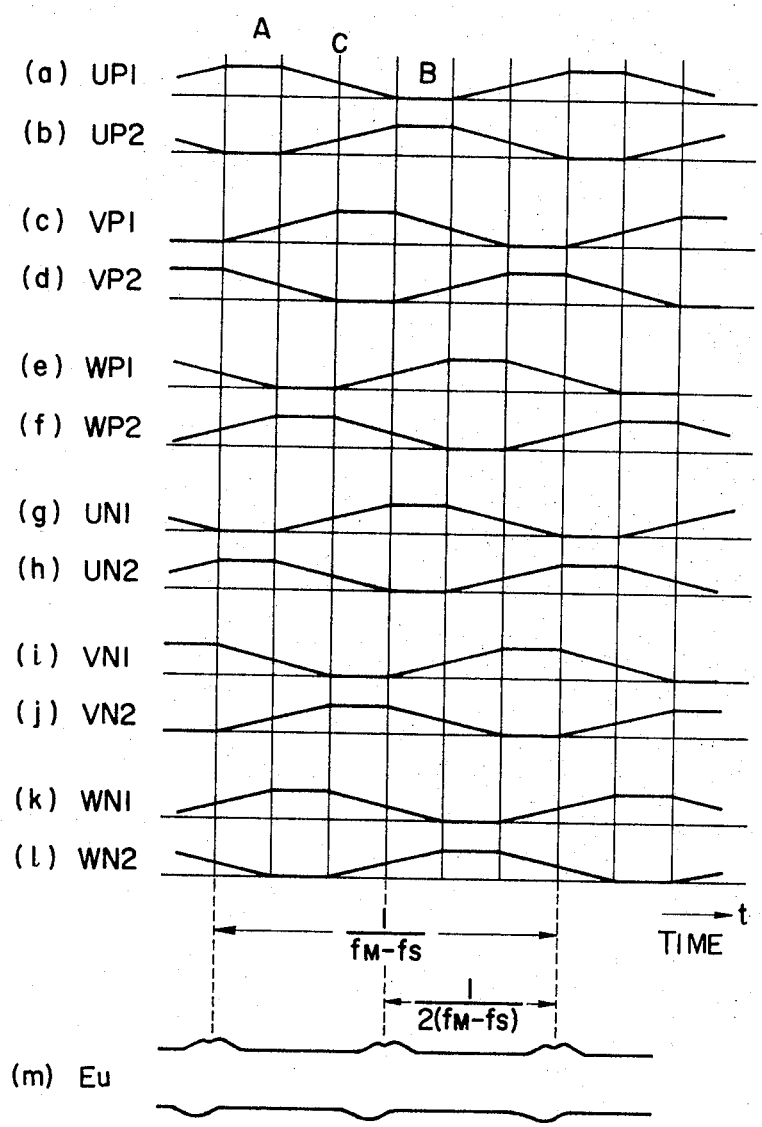
FIG. 5 shows signal waveforms useful for explaining the phenomena of current concentration on a particular thyristor arm and of the interference beating.

Next, the interference beat will be described which occurs where the frequency $f_M$ of the motor 4 is approximately equal to the frequency $f_s$ of the power source. In this case, the mean value of the current flowing through each thyristor arm is as shown in FIG. 5 and the arm current has a frequency $f_m-f_s$, i.e., difference between the frequencies $f_M$ and $f_s$, and alternately concentrates and ceases. In reference to the diagram (a) for the thyristor arm UP1, the portion A corresponds to the state of current concentration, the portion B to the non-conducting state, and the portion C to the state where the current is shared by the thyristor arm UP2. The phase voltage, as shown in the diagram (m) of FIG. 5, undulates at a frequency of $2(f_M-f_s)$. In general, the thyristor motor cannot be completely synchronized even in the synchronous performance but can only be operated in near-synchronism, so that the beat phenomenon cannot be prevented. The beat can be interpreted as a fluctuation in the voltage of the power source. Namely, the beat will cause torque ripple in a rotary machine as an electric load and alternate bright and dull luminescence in an incandescent lamp. This is a fatal drawback.

Before describing the embodiments of the present invention, the phenomena which form the fundamentals of the present invention will be explained.

As described above, if the frequency $f_M$ of the motor 4 is approximately equal but not in perfect synchronism with the frequency $f_s$, the thyristor arm draws during one period concentrated current and during the other period no current. Accordingly, if the motor 4 is operated at a constant frequency by controlling the lagging angle $\alpha$ of controlling the firing of thyristor arms, in the phase of the power source and the four non-conducting thyristor arms are disconnected, then the thyristor motor tends to be synchronized and a pull-in phenomenon is caused, so that synchronous operation can be realized. This has been deduced by the experimental results. After the disconnection, the arm current is shared by the remaining eight arms and hence the frequency of the motor 4 and the output current of the cyclo converter 3 are made constant, that is, a stable synchronized state is established. In this case, the fluctuation in the phase current is not caused and the beat in the phase voltage is eliminated.

The synchronizing effect as described above is considered to be caused as follows. Even in case where the thyristor motor is operated in the synchronized state, with no thyristor arm disconnected, the current flowing through the d.c. reactor 2 contains a ripple component in timing with the frequency of the power source since the capacity of the reactor is finite. The ripple component flows asymmetrically through the phases U, V and W of the cycloconverter 3 so that there is generated a transfer electrical power to mechanical power due to the ripple component, which power, although very small, can be the cause of the synchronizing effect. If the non-conducting thyristor arms are selectively disconnected while the motor 4 is operated at a constant frequency or with a constant rotation thereof near the synchronized speed by controlling the angle $\alpha$ for controlling the power source, then due to the effect of the maintaining of a constant frequency taking place when the frequency of the motor 4 is going to exceed that of the power source, the control angle of retardation $\alpha$ of control at the power sending side of the cycloconverter 3 varies so that the single-phase component may increase. Accordingly, the commutation power due to the single phase component increases to add to the above described synchronizing effect. The experiments have revealed that the synchronous drawing occurs if the thyristor arms are disconnected in case where the frequencies $f_M$ and $f_s$ of the motor 4 and the power source are such that $f_s + 1 > f_M \geq f_s$. The present invention uses the synchronous drawing phenomenon as described above.

Figure 6:
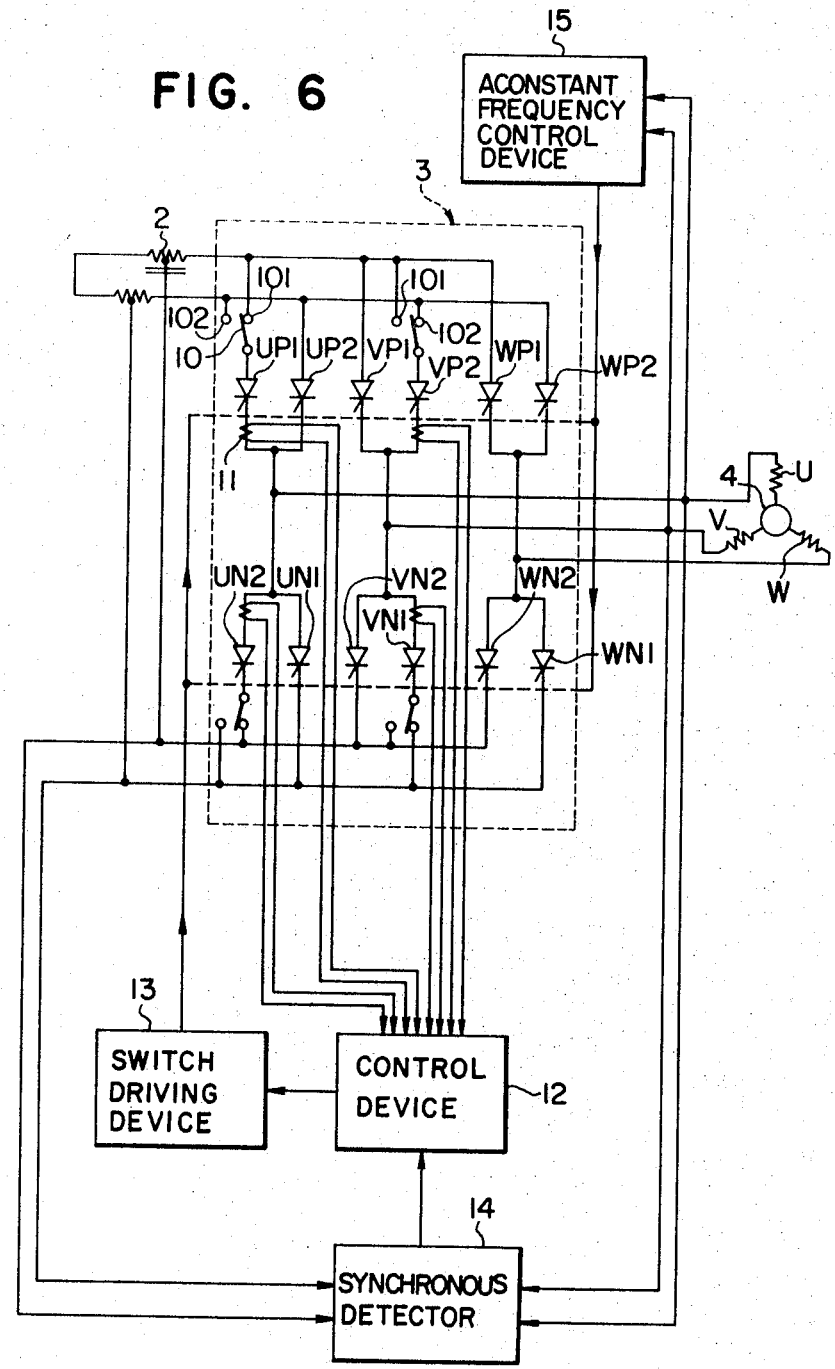
FIG. 6 is an electric circuit of a thyristor motor as one embodiment of the present invention.

FIG. 6 shows one embodiment of the present invention in an electrical circuit, in which are shown changeover switches 10 having contacts 101 and 102, provided for the thyristor arms UP1, VP2, UN2 and VN1; detectors 11 for detecting arm currents; a control device 12 for selectively controlling the switches; a device 13 for driving the switches; a synchronous detector 14; and a constant frequency control device 15 for controlling the retardation angle $\alpha$ of controlling the power source to perform constant frequency control. The other parts are similar to those indicated at the same reference numerals and characters in FIG. 1. In this embodiment, however, the distributor 5, the phase shifter 6 and the AND gate 7 are not taken into consideration.

Now, suppose that the constant frequency control with reference to the frequency of the power source is under way by means of the control device 15. In this case, the control system creates a small error, i.e., deviation between the frequency of the motor and that of the source, due to the offset or regular error of the system so that current concentrates on the thyristor arms in circulating order. According to the present invention, in such a condition the synchronous detector 14 detects the frequency $f_M$ when it is within the pull-in region while the current detectors 11 detect the non-conduction of the thyristor arms UP1, VP2, UN2 and VN1. When the frequency $f_M$ is within the pull-in range and all the thyristor arms UP1, VP2, UN2 and VN1 are in the non-conductive state, the switch drive device 13 is actuated by the output of the control device 12 to open the switches 10. Consequently, as described above, the beat phenomenon is eliminated. However, there is still remaining a problem of current concentration. In order to solve this problem, the disconnected thyristor arms UP1, VN1 and VP2, UN2 are connected respectively with the contacts 101 and 102 so that those thyristor arms are connected in parallel with the thyristor arms through which current concentrates. Therefore, the concentrated current is branched out through the added thyristor arms so that the current concentration upon a particular thyristor arm can be prevented. In this way, the thyristor in each arm need not have a capacity large enough to withstand such a concentrated current.

Figure 7:
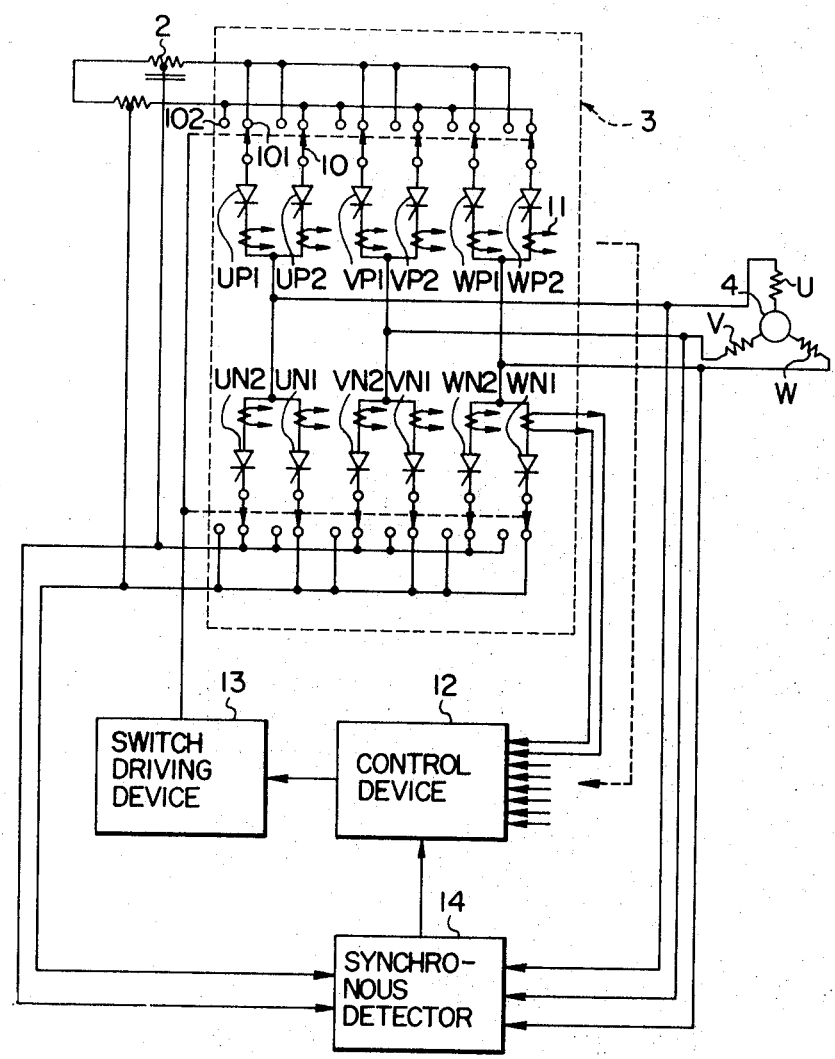
FIG. 7 is an electric circuit of a thyristor motor as another embodiment of the present invention.

FIG. 7 shows the electric circuit of a thyristor motor as another embodiment of the present invention. The feature of the embodiment is the provision of switches 10 and arm current detectors 11 in all the thyristor arms. In the previous embodiment shown in FIG. 6, even if the synchronous detector 14 detects the frequency $f_M$ of the motor 4 lying within the synchronous drawing range, the time when all the arms that are provided with the switches 10 become non-conductive has to be still waited for. However, the simultaneous non-conduction of four specified arms does not easily occur since the quasi synchronism is established before the synchronous drawing. For this reason, in this embodiment, the parallel connection is made by arbitrarily selecting four non-conducting arms, which makes the above described circuit configuration essential.

Figure 8:
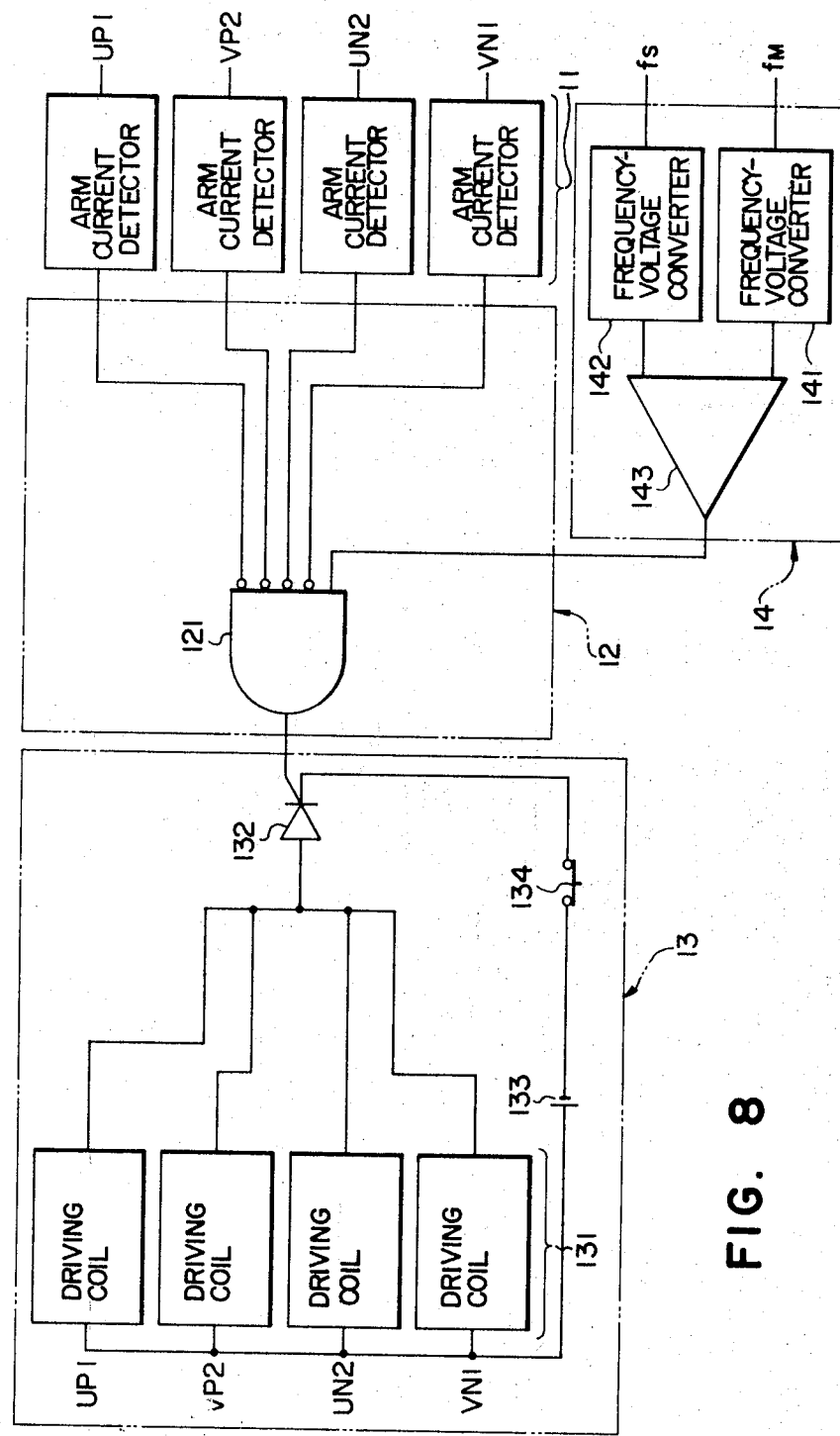
FIG. 8 shows a pull-in circuit used in the embodiment of the present invention shown in FIG. 6.
Figure 9:
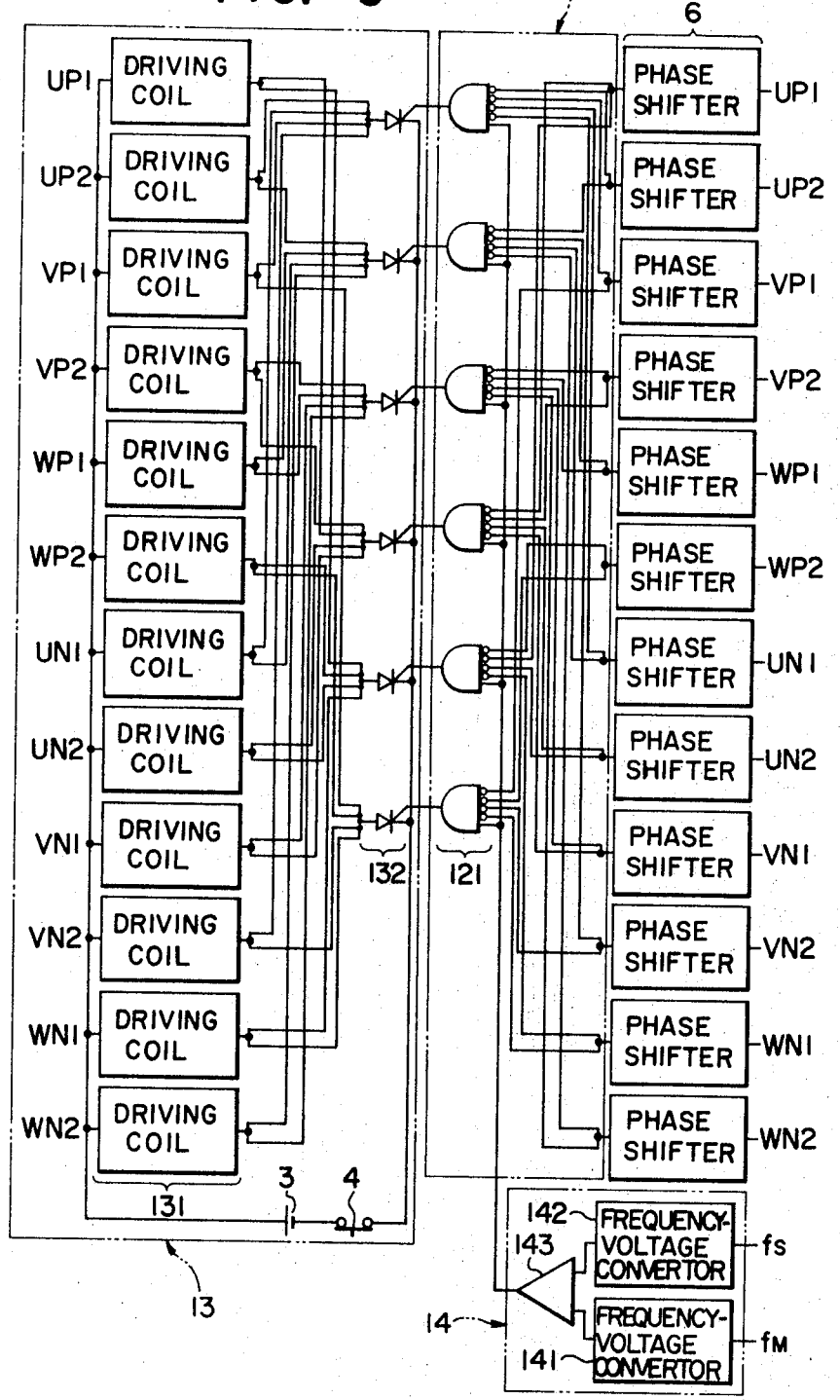
FIG. 9 shows a pull-in circuit used in the embodiment of the present invention shown in FIG. 7.

FIGS. 8 and 9 show concrete circuits of the control device 12, the switch driving device 13 and the synchronous detector 14. The circuit shown in FIG. 8 is for the pull-in control device used with the thyristor motor shown in FIG. 6 and the circuit in FIG. 9 is for the synchronous drawing control device used with the thyristor motor shown in FIG. 7. The control device 12, in FIG. 8, is an AND gate 121 having four inverted inputs receiving the outputs of the arm current detectors 11 and a non-inverted input receiving the output of the synchronous detector 14. The switch driving device 13 is constituted of driving coils 131 for actuating the switches 10, a thyristor switch 132 for switching the current to the driving coils 131, a power source 133 and a power switch 134. The synchronous detector 14 consists of frequency-voltage converters 141 and 142 respectively for converting the frequency $f_M$ of the motor and the frequency $f_s$ of the power source into the corresponding voltages and a comparator 143.

With the circuit shown in FIG. 8, when the requirement for the synchronous drawing is satisfied, the output of the synchronous detector 14 is "1" and the outputs of the arm current detectors 11 are "0," the latter outputs being inverted into "1" to be applied to the AND gate 121. Accordingly, the AND gate 121 delivers an output "1" so that the thyristor switch 132 is rendered on to energize the coils 131. Consequently, the switches 10 of the thyristor arms are cut off so that the synchronous performance is started. At the same time, the disconnected thyristor arms are parallel connected with the conducting thyristor arms.

The circuit shown in FIG. 9 operates in a manner similar to that shown in FIG. 8. When the requirement for the synchronous drawing is satisfied, one of six AND gates 121 delivers an output "1" so that the corresponding thyristor switch 132 is turned on. Accordingly, a necessary set of driving coils 131 are energized so that the associated switches 10 of the thyristor arms are turned on to start the synchronous performance and to simultaneously parallel connecting the disconnected thyristor arms with the conducting thyristor arms.

As described above, according to the present invention, the synchronous drawing is performed by disconnecting the non-conducting thyristor arms and simultaneously the disconnected thyristor arms are parallel connected with the thyristor arms on which current concentrates. Accordingly, the interference beating can be eliminated and the problem of the capacity of the thyristors due to current concentration can also be solved.

What we claim is:

1. A thyristor motor comprising a synchronous motor, a cycloconverter connected with said synchronous motor to supply electric power for said motor, current detectors provided in the thyristor arms of said cycloconverter, switches provided in said thyristor arms, a means for detecting the coincidence between the frequencies between the power source and said motor, and another means for determining an instant at which said switches are opened depending upon the output signals of said current detector and said detecting means.

2. A thyristor motor as claimed in claim 1, wherein said cycloconverter is constituted of a plurality of thyristors.

3. A thyristor motor as claimed in claim 1, wherein said cycloconverter is a converter which converts single-phase alternating current to three-phase alternating current.

4. A thyristor motor as claimed in claim 3, wherein said cycloconverter is constituted of a plurality of thyristors.

5. A thyristor motor as claimed in claim 1, wherein there is provided a means for connecting the arms disconnected by said switches, in parallel with the other arms.

6. A thyristor motor as claimed in claim 2, wherein there is provided a means for connecting the arms disconnected by said switches, in parallel with the other arms.

7. A thyristor motor as claimed in claim 3, wherein there is provided a means for connecting the arms disconnected by said switches, in parallel with the other arms.

8. A thyristor motor as claimed in claim 4, wherein there is provided a means for connecting the arms disconnected by said switches, in parallel with the other arms.

9. A thyristor motor as claimed in claim 3, wherein said current detector and said switches are provided in the thyristor arms associated with two of the three phases, some of said current detectors and said switches associated with the negative thyristor arms of said phases being provided for one of the bus bars of a power source while the other of said current detectors and switches associated with the positive thyristor arms of said phases are provided for the other bus bar of said source.

10. A thyristor motor as claimed in claim 4, wherein an electric load is connected.

11. A thyristor motor as claimed in claim 4, wherein an electric load and a mechanical load are both connected.

* * * * *

UNITED STATES PATENT OFFICE
CERTIFICATE OF CORRECTION

Patent No. 3,832,611    Dated August 27, 1974

Inventor(s) Yoshimitsu Onoda, et al

It is certified that error appears in the above-identified patent and that said Letters Patent are hereby corrected as shown below:

Portion of Figure 1 which now appears as:

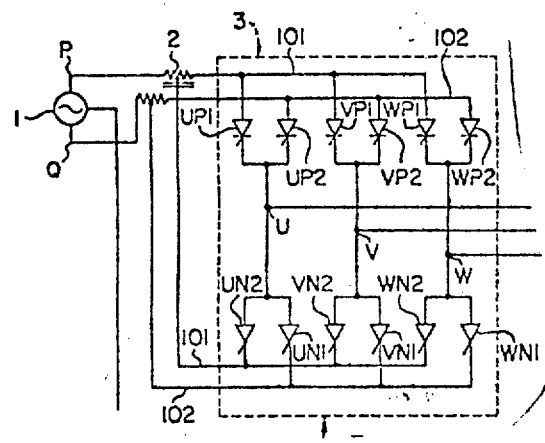

Should appear as follows:

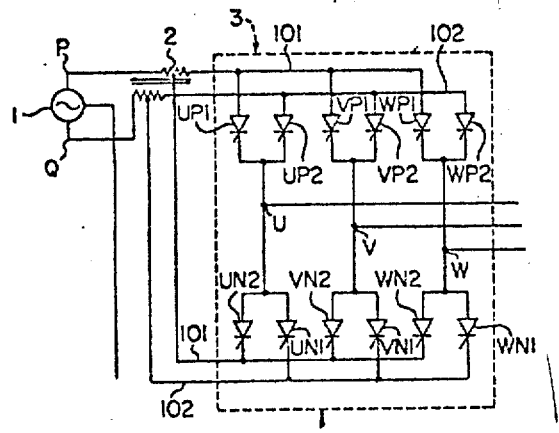

Figure 3, line (c), should read as follows:
    Voltage of
        a.c. SOURCE 1

Page 2 of 3
UNITED STATES PATENT OFFICE
CERTIFICATE OF CORRECTION

Patent No. 3,832,611      Dated August 27, 1974

Inventor(s) Yoshimitsu Onoda, et al

It is certified that error appears in the above-identified patent and that said Letters Patent are hereby corrected as shown below:

Portion of Figure 6 which appears as:

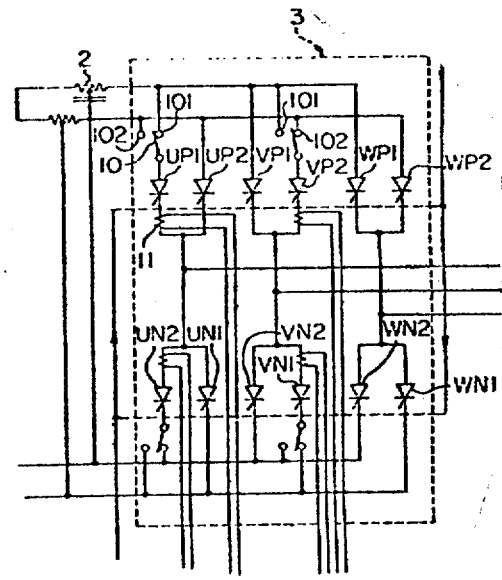

Should appear as follows:

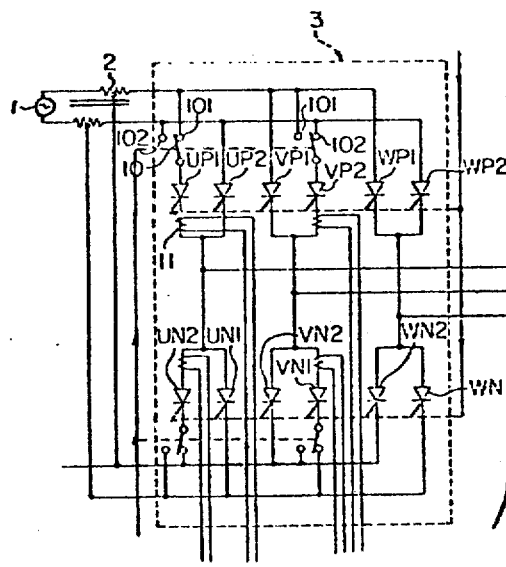

UNITED STATES PATENT OFFICE
CERTIFICATE OF CORRECTION

Patent No. 3,832,611  Dated August 27, 1974

Inventor(s) Yoshimitsu Onoda, et al

It is certified that error appears in the above-identified patent and that said Letters Patent are hereby corrected as shown below:

Portion of Figure 7 which now appears as:

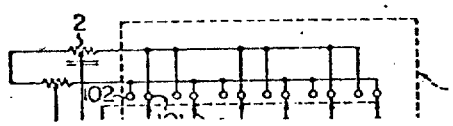

Should appear as follows:

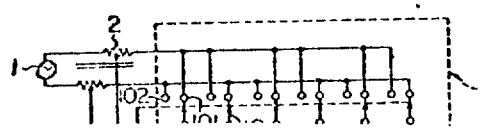

Figure 9, change "PHASE SHIFTER" identified by reference numeral "6" to -- ARM CURRENT DETECTOR 11 --.

Signed and Sealed this

Thirteenth Day of July 1976

[SEAL]

Attest:

RUTH C. MASON
Attesting Officer

C. MARSHALL DANN
Commissioner of Patents and Trademarks